United States Patent
Guo et al.

(10) Patent No.: US 12,299,837 B2
(45) Date of Patent: May 13, 2025

(54) METHOD FOR FAST DOMAIN ADAPTATION FROM PERSPECTIVE PROJECTION IMAGE DOMAIN TO OMNIDIRECTIONAL IMAGE DOMAIN IN MACHINE PERCEPTION TASKS

(71) Applicant: Robert Bosch GmbH, Stuttgart (DE)

(72) Inventors: Yuliang Guo, Palo Alto, CA (US); Zhixin Yan, Shanghai (CN); Yuyan Li, Columbia, MO (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 17/545,673

(22) Filed: Dec. 8, 2021

(65) Prior Publication Data

US 2023/0177637 A1  Jun. 8, 2023

(51) Int. Cl.
*G06T 3/08* (2024.01)
*G06T 3/4046* (2024.01)
*G06T 7/73* (2017.01)

(52) U.S. Cl.
CPC .............. *G06T 3/08* (2024.01); *G06T 3/4046* (2013.01); *G06T 7/73* (2017.01)

(58) Field of Classification Search
None
See application file for complete search history.

(56) References Cited

U.S. PATENT DOCUMENTS

| | | | |
|---|---|---|---|
| 2021/0295594 A1* | 9/2021 | Sinha | G06V 20/64 |
| 2022/0164986 A1* | 5/2022 | Zhang | G06T 7/73 |
| 2022/0165021 A1* | 5/2022 | Kawaguchi | G06T 3/08 |
| 2022/0335303 A1* | 10/2022 | Haidar | G06N 3/096 |

FOREIGN PATENT DOCUMENTS

| | | | | |
|---|---|---|---|---|
| KR | 101912396 B1 * | 10/2018 | | H04N 23/58 |
| WO | WO-2020069049 A1 * | 4/2020 | | G06N 3/0454 |

OTHER PUBLICATIONS

Hinton, G. et al., "Distilling the Knowledge in a Neural Network," arXiv:1503.02531, 2015, https://arxiv.org/abs/1503.02531v1 (9 pages).
(Continued)

*Primary Examiner* — Aaron M Richer
(74) *Attorney, Agent, or Firm* — Maginot, Moore & Beck LLP (57) ABSTRACT

A system and method are disclosed herein for developing a machine perception model in the omnidirectional image domain. The system and method utilize the knowledge distillation process to transfer and adapt knowledge from the perspective projection image domain to the omnidirectional image domain. A teacher model is pre-trained to perform the machine perception task in the perspective projection image. A student model is trained by adapting the pre-existing knowledge of the teacher model from the perspective projection image domain to the omnidirectional image domain. By way of this training, the student model learns to perform the same machine perception task, except in the omnidirectional image domain, using limited or no suitably labeled training data in the omnidirectional image domain.

5 Claims, 7 Drawing Sheets

(56) References Cited

OTHER PUBLICATIONS

Gou, J. et al., "Knowledge Distillation: A Survey," arXiv:2006.05525, 2021, https://arxiv.org/abs/2006.05525v7 (36 pages).
He, K. et al., "Deep Residual Learning for Image Recognition," CVPR, Computer Vision Foundation, 2016 (9 pages).
Wu, Z. et al., "Wider or Deeper: Revisiting the ResNet Model for Visual Recognition," arXiv:1611.10080v1, 2016, https://arxiv.org/abs/1611.10080 (19 pages).
Huang, G. et al., "Densely Connected Convolutional Networks," arXiv:1608.06993v5, 2018, https://arxiv.org/pdf/1608.06993.pdf (9 pages).
Cohen, T. S. et al., "Spherical CNNS," arXiv:1801.10130v3, 2018, https://arxiv.org/pdf/1801.10130.pdf (15 pages).
Su, Y.-C., "Kernel Transformer Networks for Compact Spherical Convolution," IEEE Conference on Computer Vision and Pattern Recognition, CVPR, 2019, arXiv:1812.03115v2 (14 pages).
Wei, C.-Y et al., "Taking a hint: How to leverage loss predictors in contextual bandits?," Proceedings of Machine Learning Research, 2020, vol. 125, pp. 1-52 (52 pages).
Silberman, N. et al., "Indoor Segmentation and Support Inference from RGBD Images," In 12th European Conference on Computer Vision, 2012 (14 pages).
Armeni, I. et al., "Joint 2D-3D-Semantic Data for Indoor Scene Understanding," arXiv:1702.01105v2, 2017, https://arxiv.org/abs/1702.01105v2 (9 pages).

* cited by examiner

METHOD FOR FAST DOMAIN ADAPTATION FROM PERSPECTIVE PROJECTION IMAGE DOMAIN TO OMNIDIRECTIONAL IMAGE DOMAIN IN MACHINE PERCEPTION TASKS

FIELD

The system and method disclosed in this document relates to machine perception and, more particularly, to domain adaptation from perspective projection image domain to omnidirectional image domain in machine perception tasks.

BACKGROUND

Unless otherwise indicated herein, the materials described in this section are not admitted to be the prior art by inclusion in this section.

Omnidirectional images, also called 360 images or panoramic images, are one of the most popular image types for many applications such as virtual reality, autonomous driving, and robotics. With the rapid growth of commercial 360-cameras in the consumer market in recent years, more and more omnidirectional images are generated daily. However, compared with the amount of perspective projection images captured by regular cameras, the number of omnidirectional images is still very limited.

Learning-based techniques are frequently applied to machine perception tasks involving perspective projection images. However, such learning-based techniques cannot easily be applied to machine perception tasks involving omnidirectional images because the amount omnidirectional images that are suitably labelled for learning-based techniques is extremely limited. One solution is to convert omnidirectional images to multiple perspective projection images and simply utilize existing resources in the perspective projection domain (e.g., trained models, public datasets, etc.) to perform machine perception tasks. However, this solution suffers from a significant increase in computation cost during inference due to the large number of perspective projection images.

Accordingly, what is needed is a technique that allows for learning-based techniques for machine perception tasks to be applied directly to the omnidirectional image domain, in spite of the very limited amount omnidirectional images that are suitably labeled for such learning-based techniques.

SUMMARY

A method for training a model to perform a perception task with respect to omnidirectional images is disclosed. The method comprises receiving, with a processor, an omnidirectional image. The method further comprises generating, with the processor, a plurality of perspective projection images based on the omnidirectional image. The method further comprises determining, with the processor, a first plurality of perception outputs based on the plurality of perspective projection images using a first model, the first model being configured to perform the perception task with respect to perspective projection images. The method further comprises training, with the processor, a second model using the omnidirectional image and depending on the first plurality of perception outputs, the second model being trained to perform the perception task with respect to perspective projection images.

A method for operating a device to perform a perception task is disclosed. The method comprises capturing, with a 360-camera sensor of the device, an omnidirectional image of an environment. The method further comprises generating, with a processor of the device, final perception outputs for the omnidirectional image using a trained model configured to perform the perception task with respect to omnidirectional images, the trained model having been trained in-part using a further model configured to perform the perception task with respect to perspective projection images.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Figure 1:
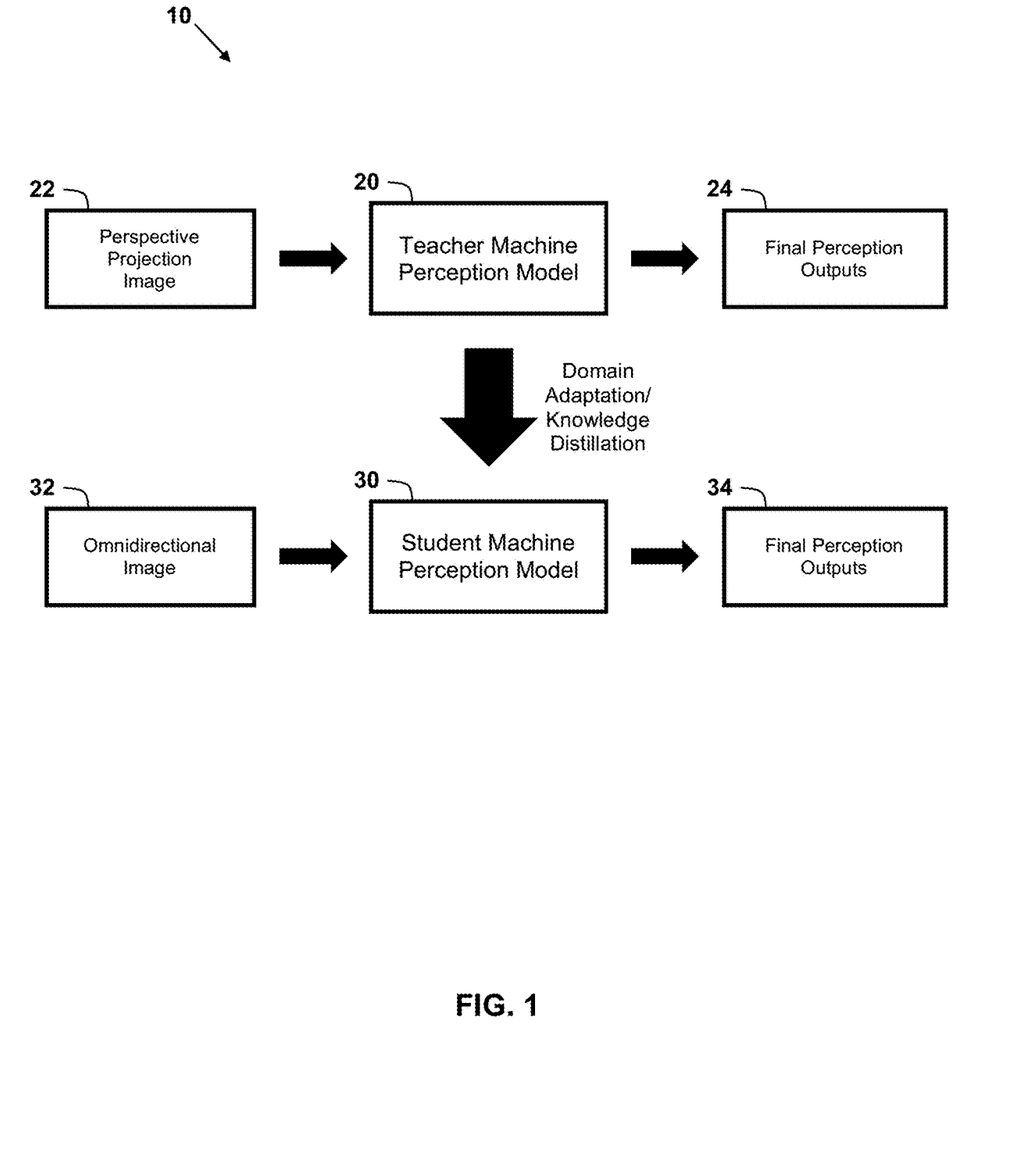
FIG. 1 summarizes a knowledge distillation process for developing a machine perception model in the omnidirectional image domain.

FIG. 1 summarizes a knowledge distillation process 10 utilized by the system and methods described herein to develop a machine perception model in the omnidirectional image domain using limited or no suitably labeled training data in the omnidirectional image domain. Particularly, the system and method utilize the knowledge distillation process 10 to transfer and adapt knowledge from the perspective projection image domain to the omnidirectional image domain. A teacher model 20 is pre-trained on perspective projection image data and is configured to perform a machine perception task in which certain final perception outputs 24 (e.g., depth estimations, semantic segmentation labels) are generated in the perspective projection image domain based on a perspective projection image 22.

A student model 30 is trained, at least in-part, by adapting the pre-existing knowledge of the teacher model 20 from the perspective projection image domain to the omnidirectional image domain. By way of this training, the student model 30 learns to perform the same machine perception task, except in the omnidirectional image domain. More particularly, the student model 30 learns to generate certain final perception outputs 34 (e.g., depth estimations, semantic segmentation labels) in the omnidirectional image domain based on an omnidirectional image 32. Thus, by leveraging the knowledge distillation process 10, the system and methods described herein advantageously enable the development of a more robust machine perception model with efficient inference speed in the omnidirectional image domain, without the need for a large amount of labeled training data in the omnidirectional image domain.

The machine perception task may include a variety of tasks performed on image data. In the exemplary embodiments described herein, the teacher model 20 and the student model 30 are configured to perform depth estimation and/or semantic segmentation, in the perspective projection image domain and the omnidirectional image domain, respectively, and utilize model architectures that are suitable for these tasks. However, it should be appreciated that the system and methods described herein can be applied to any machine perception task that is performed with respect to image data including, but not limited to, object detection and classification, visual SLAM (Simultaneous Localization and Mapping), image classification, and image processing (e.g., colorization, stylization, reconstruction, etc.).

Exemplary Model Development System

Figure 2:
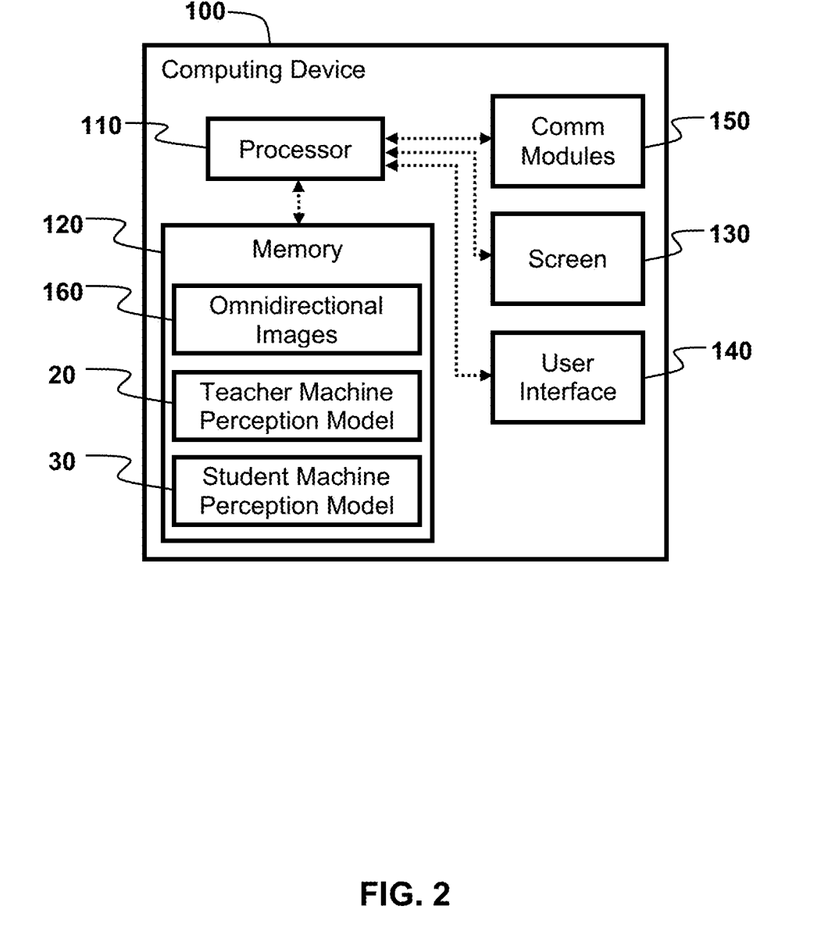
FIG. 2 shows an exemplary embodiment of a computing device that can be used to develop and train a machine perception model in the omnidirectional image domain.

FIG. 2 shows an exemplary embodiment of a computing device 100 that can be used to develop and train a machine perception model in the omnidirectional image domain. The computing device 100 comprises a processor 110, a memory 120, a display screen 130, a user interface 140, and at least one network communications module 150. It will be appreciated that the illustrated embodiment of the computing device 100 is only one exemplary embodiment is merely representative of any of various manners or configurations of a personal computer, laptop computer, tablet computer, smartphone, or any other computing devices that are operative in the manner set forth herein.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art.

The display screen 130 may comprise any of various known types of displays, such as LCD or OLED screens. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes a Wi-Fi module configured to enable communication with a Wi-Fi network and/or Wi-Fi router (not shown) configured to enable communication with various other devices. Additionally, the network communications module 150 may include a Bluetooth® module (not shown), as well as one or more cellular modems configured to communicate with wireless telephony networks.

The computing device 100 may also include a respective battery or other power source (not shown) configured to power the various components within the computing device 100. In one embodiment, the battery of the computing device 100 is a rechargeable battery configured to be charged when the computing device 100 is connected to a battery charger configured for use with the computing device 100.

In at least some embodiments, the memory 120 stores program instructions of the teacher model 20, which is configured to perform a machine perception task with respect to perspective projection images. Likewise, the memory 120 stores program instructions of the student model 30, which is to be trained to perform the machine perception task with respect to omnidirectional images, in particular using training data comprising a plurality of omnidirectional images 160 and using the knowledge distillation process 10, discussed above.

Methods for Training a Machine Perception Model in the Omnidirectional Domain

A variety of methods and processes are described below for operating the computing device 100 to develop and train the student model 30 to perform a machine perception task in the omnidirectional image domain. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 to perform the task or function. Additionally, the steps of the methods may be performed in any feasible chronological order, regardless of the order shown in the figures or the order in which the steps are described.

Figure 3:
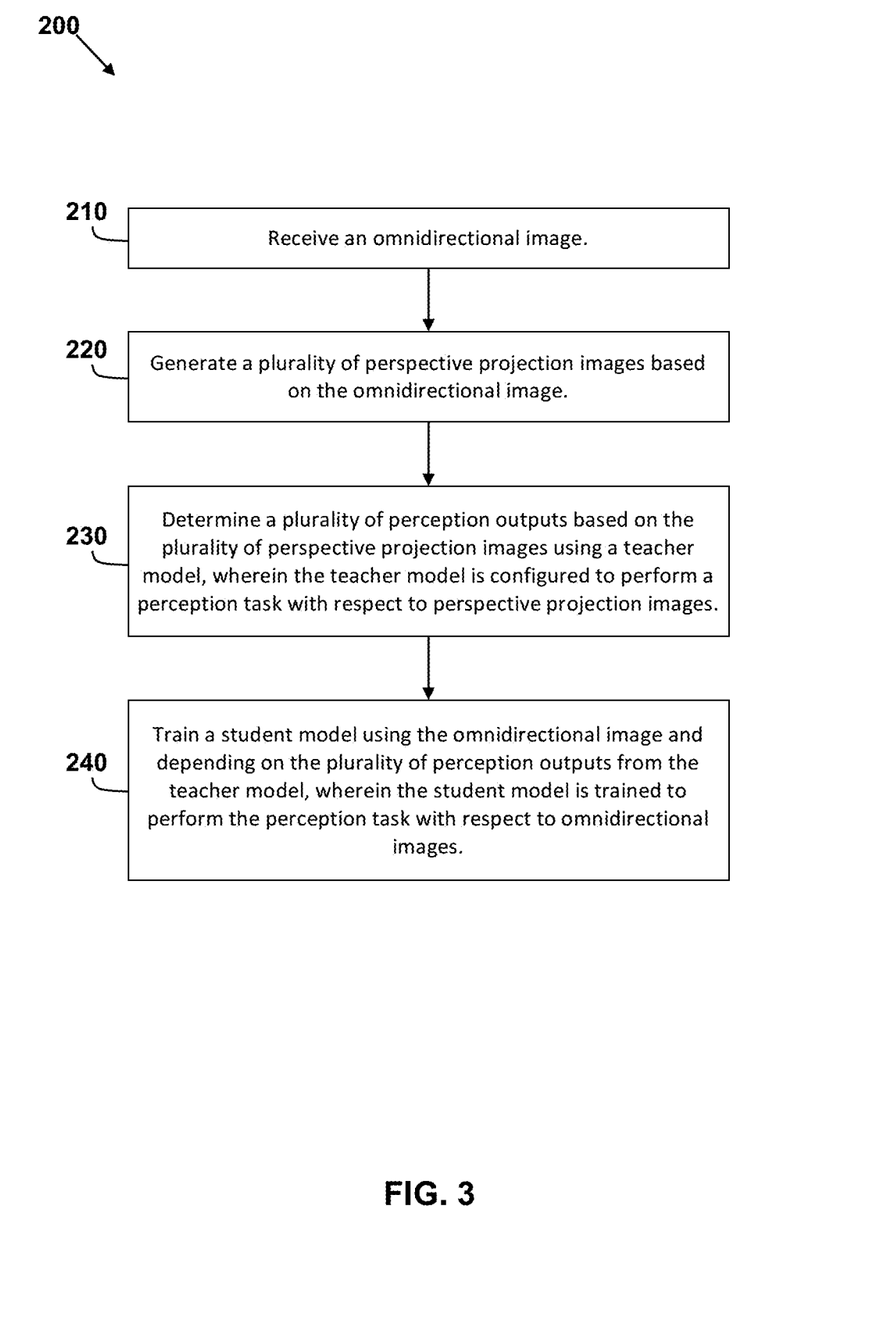
FIG. 3 shows a method for developing a machine perception model in the omnidirectional image domain.

FIG. 3 shows a method 200 for developing a machine perception model in the omnidirectional image domain. The method 200 advantageously leverages a knowledge distillation process in which knowledge from a teacher model that performs a machine perception task in perspective projection image domain is transferred and adapted for a student model that performs the same machine perception task in the omnidirectional image domain. By way of this domain adaptation, the method 200 advantageously enables the development of a more robust machine perception model in the omnidirectional image domain, without the need for a large amount of labeled training data in the omnidirectional image domain.

The method 200 begins with receiving an omnidirectional image (block 210). Particularly, the processor 110 receives, and stores in the memory 120, a plurality of omnidirectional images (i.e., the omnidirectional images 160). As used herein, the term "omnidirectional image" refers to any image captured with a field of view that covers 360 degrees (i.e., a full circle) in at least one plane and, in some cases, covers an entire sphere. Such omnidirectional images may also be referred to as "360 images" or "panoramic images." It should be appreciated that omnidirectional images may utilize a variety of different image formats, such as the Equirectangular Projection (ERP) image format, the Cubemap Projection (CMP) image format, and the Equiangular Cubemap Projection (EAC) image format.

As discussed in greater detail below, these omnidirectional images 160 are used to train the student model 30 to perform a machine perception task such as, but not limited to, depth estimation or semantic segmentation. However, in at least some embodiments, the omnidirectional images 160 do not have any ground-truth labels, such as ground truth depth maps or semantic maps corresponding to each omnidirectional image. Alternatively, the omnidirectional images 160 may include ground-truth labels for only some images or include incomplete ground-truth labels.

The method 200 continues with generating a plurality of perspective projection images based on the omnidirectional image (block 220). Particularly, for each respective omnidirectional image, the processor 110 generates a plurality of perspective projection images based on the respective omnidirectional image. As used herein, the term "perspective projection image" refers to any image having a limited field of view and captured or generated from a fixed camera perspective, for example using perspective projection techniques.

Figure 4:
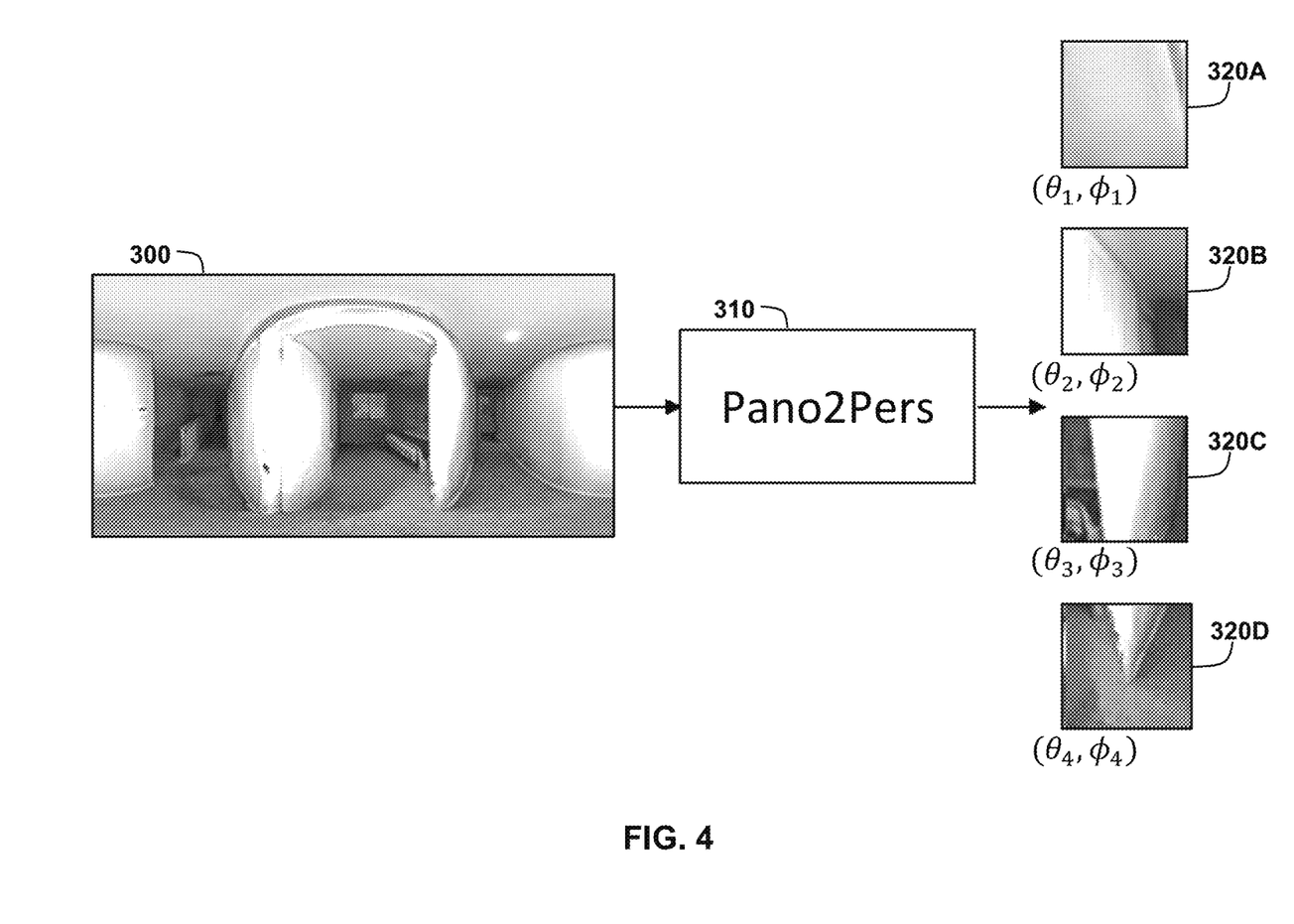
FIG. 4 shows an exemplary module for generating perspective projection images from an omnidirectional image.

In general, the processor 110 generates plurality of perspective projection images by undistorting and splitting the respective omnidirectional image into multiple perspective projection image patches. FIG. 4 shows an exemplary module for generating perspective projection images from an omnidirectional image. Particularly, an input omnidirectional image 300, in particular an Equirectangular Projection (ERP) image, is provided to a Pano2Pers (Pano-to-Perspective) module 310, which outputs multiple perspective projection images 320A, 320B, 320C, and 330D, which are generated from different viewing angles $(\theta_1, \phi_1)$, $(\theta_2, \phi_2)$, $(\theta_3, \phi_3)$, and $(\theta_4, \phi_4)$, respectively. In each case, the perspective projection images 320A-D consist of an image patch or portion from the input omnidirectional image 300, which has been undistorted.

The Pano2Pers module 310 is a customized differentiable layer which undistorts and interpolates omnidirectional images from the omnidirectional image domain to the perspective projection domain. Additionally, as will be seen below, the Pano2Pers module 310 can also be utilized to convert perception outputs from the student model 30, including high dimensional intermediate feature extraction outputs and final perception output predictions, which are in the omnidirectional image domain to perception outputs in perspective projection domain.

Figure 5:
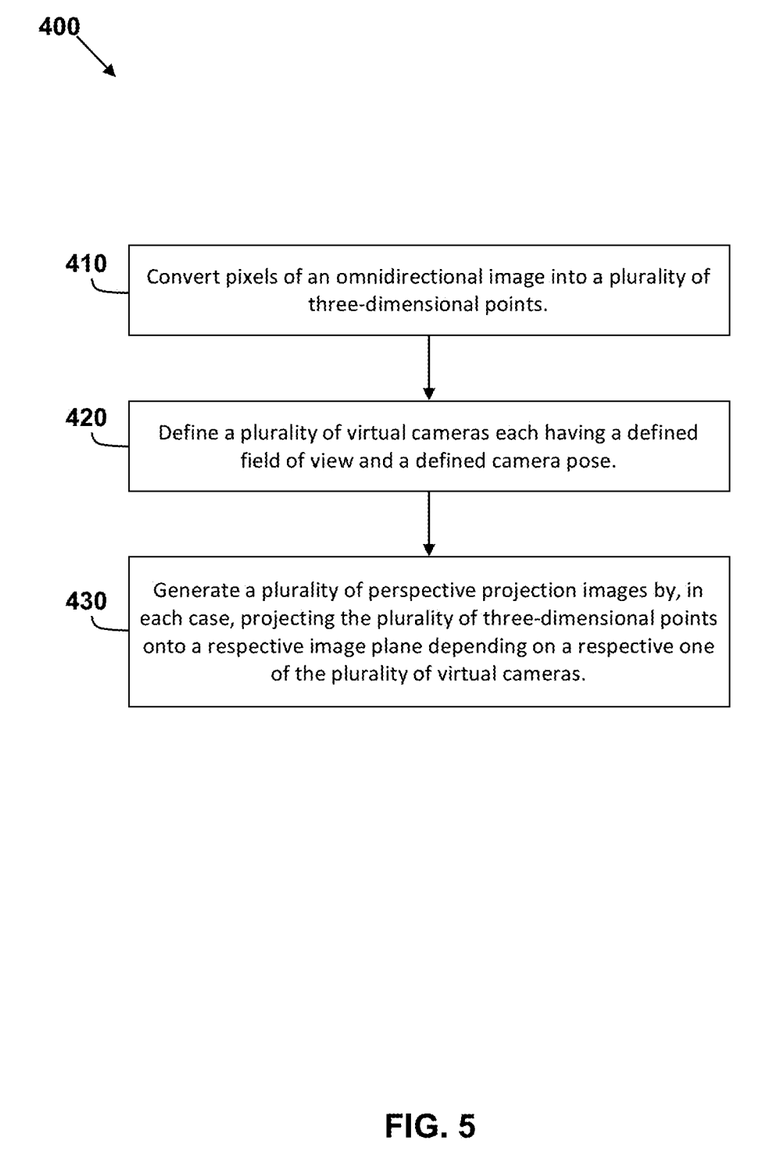
FIG. 5 shows a method for generating perspective projection images based on an omnidirectional image.

FIG. 5 shows a method 400 for generating perspective projection images based on an omnidirectional image, which is implemented, for example, by the Pano2Pers module 310. The method 400 begins with converting pixels of an omnidirectional image into a plurality of three-dimensional points (block 410). Particularly, the processor 110 converts pixels of an omnidirectional image into a plurality of three-dimensional (3D) points. For example, given an ERP image, such as omnidirectional image 300 of FIG. 4, having a plurality of pixels $(u, v)^{omni}$, the processor 110 converts each respective pixel coordinate $(u, v)^{omni}$ into respective polar coordinates $(\phi, \theta)^{world}$ in the world space. In one embodiment, the processor 110 converts ERP image pixels $(u, v)^{omni}$ into polar coordinates $(\phi, \theta)^{world}$ according to the equations $\phi=u/width*\pi$ and $\theta=v/height*\pi$, where width is the width of the ERP image and height is the height of the ERP image. Given the polar coordinates $(\phi, \theta)^{world}$ and presuming an arbitrarily defined radius (e.g., a radius equal to 1), the processor 110 determines a respective Cartesian coordinate 3D point $(x, y, z)^{world}$ in the world space from each respective polar coordinate $(\phi, \theta)^{world}$. It should be appreciated, however, that the particular method for converting pixels of an omnidirectional image into three-dimensional points depends on the particular image format of the omnidirectional image. Accordingly, different but analogous processes would be utilized for omnidirectional images utilizing the CMP image format or the EAC image format.

The method 400 continues with defining a plurality of virtual cameras each having a defined field of view and a defined camera pose (block 420). Particularly, the processor 110 defines a plurality of virtual cameras each having a defined field of view and a defined camera pose. Each virtual camera is defined in the same coordinate space as the plurality of 3D points (e.g., in the Cartesian coordinate world space). In at least some embodiments, the position (i.e., the camera origin point) of each virtual camera is located at a common center point corresponding to the position from which the original omnidirectional image was captured (e.g., (0,0,0) in the Cartesian coordinate world space). Thus, the respective camera poses of the plurality of virtual cameras only differ in their camera orientation (i.e., viewing angle from that common center point).

In at least some embodiments, the processor 110 defines the camera poses of the plurality of virtual camera by defining a plurality of viewing angles. In one embodiment, the defined viewing angles are distributed in a uniform manner through the available angle space (e.g., across two degrees of freedom, horizontal and vertical). Next, the processor 110 defines a field of view for each of the plurality of virtual cameras. In some embodiments, the processor 110 defines all of the plurality of virtual cameras to have the same field of view. In at least one embodiment, the processor 110 selects the fields of view such that the viewing frustums of the plurality of virtual cameras overlap with one another. Thus, in embodiments utilizing a relatively sparser array of unique camera viewing angles, the field of view of each virtual camera is defined relatively wider. Conversely, in embodiments utilizing a relatively denser array of unique camera viewing angles, the field of view of each virtual camera can be defined relatively narrower.

The method 400 continues with generating a plurality of perspective projection images by, in each case, projecting the plurality of three-dimensional points onto a respective image plane depending on a respective one of the plurality of virtual cameras (block 430). Particularly, the processor 110 generates a plurality of perspective projection images using the plurality of virtual cameras and based on the omnidirectional image. More particularly, to generate each respective perspective projection image, the processor 110 projects the 3D points $(x, y, z)^{world}$ corresponding to the pixels $(u, v)^{omni}$ of the omnidirectional image onto an image plane using a respective virtual camera.

To this end, to generate a respective perspective projection image using a respective virtual camera, the processor 110 first selects a focal length f and defines an image plane that is positioned at the focal length f from the camera origin of respective virtual camera and which is perpendicular to the viewing angle of the respective virtual camera. In at least some embodiments, the processor 110 selects the same focal length f for all of the plurality of perspective projection images. Next, the processor 110 projects the 3D points (x, y, z)$^{world}$ corresponding to the pixels (u, v)$^{omni}$ of the omnidirectional image onto the defined image plane, to recover a plurality of 2D image points (X, Y)$^{pers}$ corresponding to each of the 3D points (x, y, z)$^{world}$ captured in the viewing frustum of the respective virtual camera. Finally, the processor 110 generates the respective perspective projection image based on plurality of 2D image points (X, Y)$^{pers}$. In particular, the processor 110 determines color values for each pixel in the respective perspective projection based on the plurality of 2D image points (X, Y)$^{pers}$ and the color values of the corresponding pixels (u, v)$^{omni}$ from the original omnidirectional image, for example using various rasterization or interpolation techniques (e.g. linear, bi-linear, cubic interpolation). The processor 110 repeats this process for each of the plurality of virtual cameras to generate the plurality of perspective projection images.

Returning to FIG. 3, the method 200 continues with determining a plurality of perception outputs based on the plurality of perspective projection images using a teacher model, wherein the teacher model is configured to perform a perception task with respect to perspective projection images (block 230). Particularly, for each respective omnidirectional image, the processor 110 provides the respective plurality of perspective projection images to the teacher model 20 to determine a respective plurality of perception outputs. As used herein, the term "perception output" refers to any intermediate or final output from a model configured to perform a perception task. The perception outputs of the teacher model 20 at least include (i) final perception outputs which are the final outputs of the teacher model 20 (e.g., depth estimations, semantic segmentation labels) and (ii) intermediate perception outputs which are output by intermediate components of the teacher model 20 (e.g., feature vectors).

The teacher model 20 may comprise any type or combination of traditional or deep-learning based models configured to perform a machine perception task in which certain final perception outputs (e.g., depth estimations, semantic segmentation labels) are generated in the perspective projection image domain based on a perspective projection image. In this way, it should be appreciated that there are no strict limitations in terms of the type of teacher model 20 that is utilized. However, the better performance the teacher network 530 can reach, the better results the student model 30 will achieve.

In at least one embodiment, the teacher model 20 is pre-trained on an existing labeled dataset in the perspective projection image domain for the particular machine perception task that is to be performed (e.g., depth estimation, semantic segmentation, etc.). However, during the knowledge distillation process, the learnable parameters of teacher model 20 are fixed.

In some embodiments, the teacher model 20 may, for example, comprise one or more machine learning models such as convolution neural networks, or the like. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow particular rules in order to provide the desired output for a given input. Instead, a machine learning model is provided with a corpus of training data from which it identifies or "learns" implicit patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to perform various operations or functions.

Figure 6:
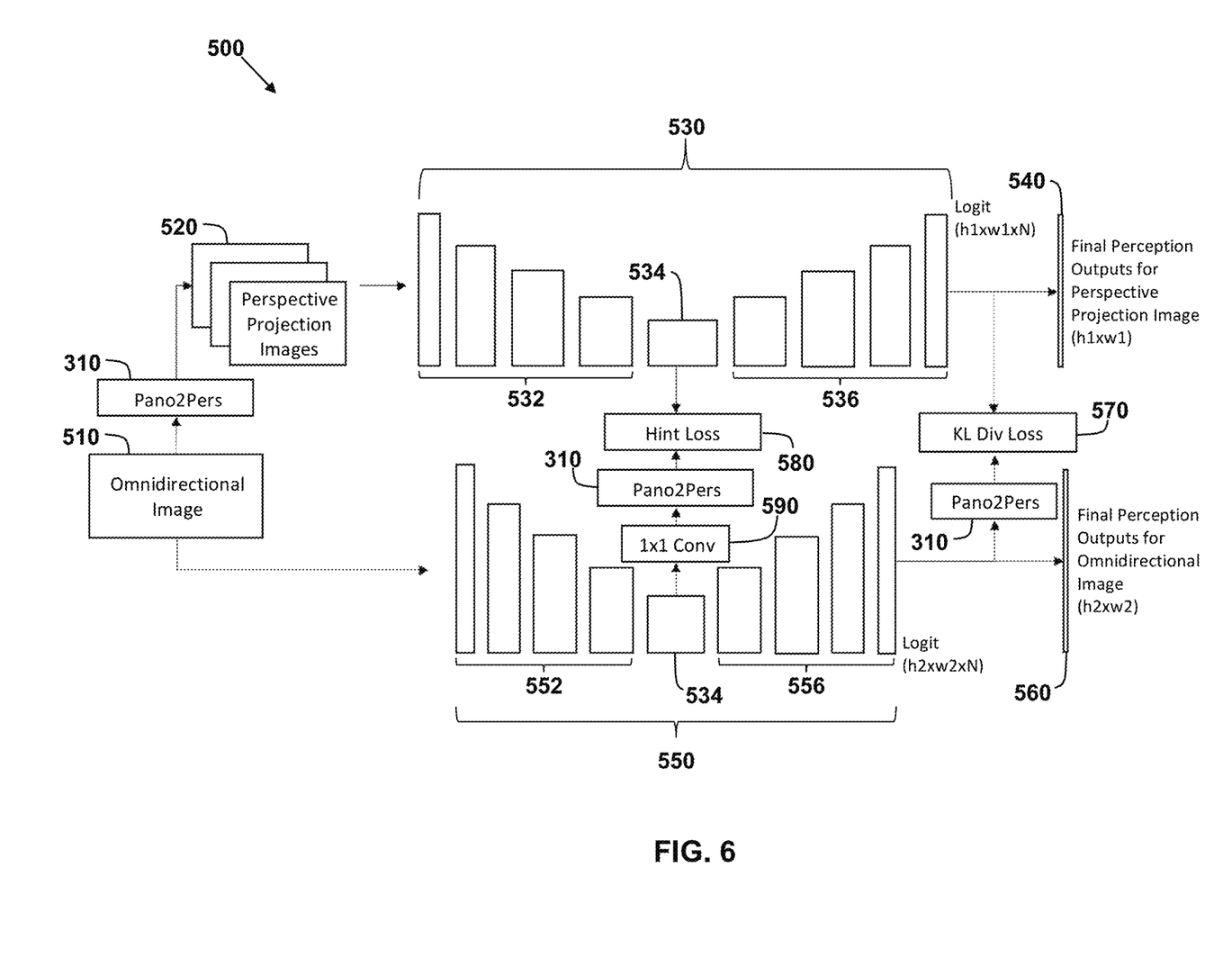
FIG. 6 shows an exemplary knowledge distillation network for developing a machine perception model in the omnidirectional image domain.

In at least one embodiment, the teacher model 20 is a convolutional neural network (e.g., DenseNet, ResNet) having an auto-encoder+auto-decoder architecture configured for dense prediction. FIG. 6 shows an exemplary knowledge distillation network 500 having a teach network 530 with an auto-encoder+auto-decoder architecture. An omnidirectional image 510 is converted into a plurality of perspective projection images 520 by the Pano2Pers module 310. The teacher network 530, which is one embodiment of the teacher model 20, receives the plurality of perspective projection images 520 and generates a plurality of perceptions outputs based on each respective perspective projection image 520. The plurality of perceptions outputs includes intermediate perception outputs (e.g., feature vectors) from each of the intermediate layers of the teacher network 530 and final perception outputs (e.g., depth estimations, semantic segmentation labels) from an output layer 540. The final perception outputs from the output layer 540 are in the perspective projection image domain.

The teacher network 530 comprises an encoder 532 having a plurality of convolution layers and pooling layers that reduce the dimensionality of the input images 520 to provide encoded intermediate perception outputs (e.g., a feature vector) at an encoded layer 534 (i.e., a bottleneck layer). In at least one embodiment, the encoder 532 includes densely connected convolutional layers (e.g., DenseNet169). The teacher network 530 further comprises a decoder 536 having a plurality of convolution or deconvolution layers and unpooling or upsampling layers that increase the dimensionality of the encoded intermediate perception outputs from the encoded layer 534 to generate an output logit (e.g., having dimensions h1×w1×N, where h1 and w1 are the height and width, respectively, of the perspective projection images 520). The output logit is normalized by the output layer 540 (e.g., softmax) to provide the final perception outputs of the teacher network 530 (e.g., having dimensions h1×w1).

As will be discussed below, the final perception outputs of the teacher model 20 for all of the plurality of perspective projection images can, in essence, be stitched together to provide pseudo ground truth labels for the original omnidirectional image 510 to provide supervision of the training of the student model 30 to perform the machine perception task. Alternatively, in cases where some actual ground truth labels already exist for the original omnidirectional image 510, the final perception outputs of the teacher model 20 can still provide additional supervision of the training of the student model 30.

Returning to FIG. 3, the method 200 continues with training a student model using the omnidirectional image and depending on the plurality of perception outputs from the teacher model, wherein the student model is trained to perform the perception task with respect to omnidirectional images (block 240). Particularly, for each respective omnidirectional image, the processor 110 trains the student model 30 using the respective omnidirectional image and depending on the plurality of perception outputs that were generated by the teacher model 20 based on the plurality of perspective projection images generated from the respective omnidirectional image. To this end, the processor 110 provides the respective omnidirectional image to the student model 30 to determine a further plurality of perception outputs. The processor 110 compares the perception outputs from the student model 30 with the perception outputs of the teacher model 20, and trains the student model 30 based on this comparison. More particularly, the processor 110 compares the perception outputs by projecting the perception outputs of the student model 30 into output space of the teacher model 20 and evaluating at least one loss function depending the projected perception outputs of the student model 30 and the perception outputs of the teacher model 20. The learnable parameters of the student model 30 are fine-tuned based on the evaluation of the at least one loss function. In this way, the student model 30 can be trained with little or no ground truth labels for the omnidirectional image domain.

Much like the teacher model 20, the student model 30 may comprise any type or combination of traditional or deep-learning based models configured to perform a machine perception task in which certain final perception outputs (e.g., depth estimations, semantic segmentation labels) are generated in the omnidirectional image domain based on an omnidirectional image. In some embodiments, the teacher model 20 may, for example, comprise one or more machine learning models such as convolution neural networks, or the like. In at least one embodiment, the student model 30 is a convolutional neural network (e.g., DenseNet, ResNet) having an auto-encoder+auto-decoder architecture configured for dense prediction, which is essentially similar to the teacher model 20.

Returning to the example of FIG. 6, the knowledge distillation network 500 further includes a student network 550 with an auto-encoder+auto-decoder architecture. The student network 550, which is one embodiment of the student model 30, receives the omnidirectional image 510 and generates a plurality of perceptions outputs based on the omnidirectional image 510. The plurality of perceptions outputs includes intermediate perception outputs (e.g., feature vectors) from each of the intermediate layers of the student network 550 and final perception outputs (e.g., depth estimations, semantic segmentation labels) from an output layer 560. The final perception outputs from the output layer 560 of the student network are essentially similar to those of the output layer 540 from the teacher network 530, except that the final perception outputs from the output layer 560 are in the omnidirectional image domain.

The student network 550 comprises an encoder 552 having a plurality of convolution layers and pooling layers that reduce the dimensionality of the input image 510 to provide encoded intermediate perception outputs (e.g., a feature vector) at an encoded layer 554 (i.e., a bottleneck layer). In at least one embodiment, the encoder 552 include densely connected convolutional layers (e.g., DenseNet121). The student network 550 further comprises a decoder 556 having a plurality of convolution or deconvolution layers and unpooling or upsampling layers that increase the dimensionality of the encoded intermediate perception outputs from the encoded layer 554 to generate an output logit (e.g., having dimensions h2×w2×N, where h2 and w2 are the height and width, respectively, of the omnidirectional image 510). The output logit is normalized by the output layer 560 (e.g., softmax) to provide the final perception outputs of the student network 550 (e.g., having dimensions h2×w2).

In at least one embodiment, the convolution layers and/or deconvolution layers of the student network 550 utilize spherical kernels or morphable kernels to address the projection distortion in the particular image format of the omnidirectional image 510 (e.g., equi-rectangular projection distortion in ERP images)

The knowledge distillation network 500 incorporates loss functions that connect corresponding layers of the teacher and student networks 530, 550 for training the student network 550. Particularly, in the illustrated embodiment, the knowledge distillation network 500 incorporates a first loss function 570 between the output layer 540 of the teacher network 530 and the output layer 560 of the student network 550. The Pano2Pers module 310 is used to project the final perception outputs at the output layer 560 from the omnidirectional image domain to the perspective projection image domain (using the same virtual cameras that generated the corresponding perspective projection images), to enable direct comparison between the final perception outputs of the teacher and student networks 530, 550. It should be appreciated that the first loss function 570 can be applied to the (normalized) final perception outputs of the output layers 540, 560 or to the (non-normalized) output logits of the decoders 536, 556.

Additionally, in the illustrated embodiment, the knowledge distillation network 500 incorporates a second loss function 580 between the encoded layer 534 (i.e., the bottleneck layer) of the teacher network 530 and the encoded layer 554 (i.e., the bottleneck layer) of the student network 550. The Pano2Pers module 310 is again used to project the encoded intermediate perception outputs at the encoded layer 554 from the omnidirectional image domain to the perspective projection image domain (using the same virtual cameras that generated the corresponding perspective projection images), to enable direct comparison between the encoded intermediate perception outputs of the teacher and student networks 530, 550. In the illustrated embodiment, a 1×1 convolution layer 590 is applied prior to the Pano2Pers module 310 to normalize or standardize the width, height, and channel depth of the encoded intermediate perception outputs at the encoded layer 554, such that the projected encoded intermediate perception outputs match the dimensionality of the encoded intermediate perception outputs at the encoded layer 534 of the teacher network 530.

The loss functions 570 and 580 may utilize a wide variety of types of losses. In at least one embodiment, the first loss function 570 is a Kullback-Leibler (KL) divergence loss or relative entropy loss that captures perceptual loss in the final perception outputs. In at least one embodiment, the second loss function 580 is a hint loss that learns the similarity between the encoded intermediate perception outputs at the encoded layers 534, 554 (i.e., between the bottleneck layers). Hint loss is a type of perceptual loss that learns the similarity between learned features.

In embodiments in which at least some ground truth labels are known for the omnidirectional images, a third loss function can be utilized to provide direct supervision of the final perceptions outputs of the student network 550 based on the ground truth labels. The third loss function is dependent on the particular machine perception task being performed. For example, for depth estimation, a mean absolute error (MAE) loss function or a mean squared error (MSE) loss function can be used. As another example, for semantic segmentation, a cross-entropy loss function can be used.

Note that, even when the ground truth labels are available, we can still utilize the first loss function 570 (e.g., KL divergence loss) as additional supervision, to strengthen the distribution-wise similarity between the results from the teacher and student networks 530, 550.

Finally, in some embodiments, any number of additional loss functions can be applied between intermediate layers of teacher and student networks 530, 550. For the intermediate layers, the particular type of loss function that should be utilized depends on the network design of the student and teacher networks 530, 550.

Exemplary End-User Device

Figure 7:
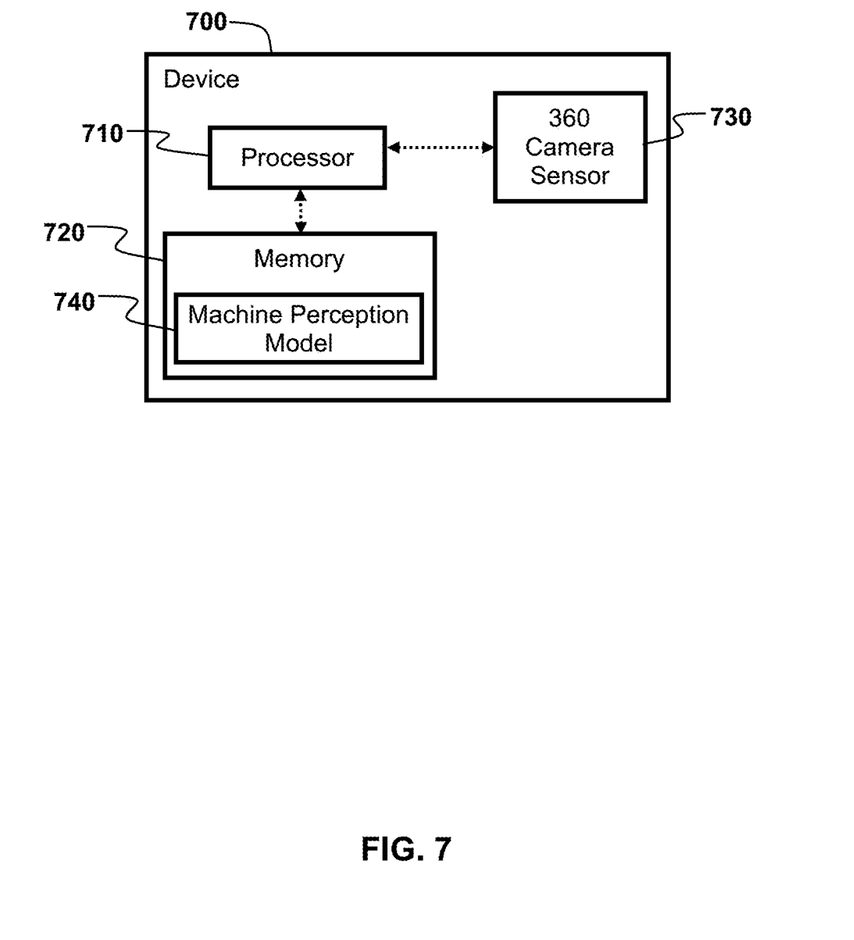
FIG. 7 shows an exemplary end-user device that incorporates the trained machine perception model.

FIG. 7 shows an exemplary end-user device 700 that incorporates the trained machine perception model 740. The end-user device 700 comprises a processor 710, a memory 720, and a 360-camera sensor 730. It will be appreciated that the end-user device 700 may comprise a wide variety of devices such as a 3D scanner or a 360-camera, as well as robotic devices incorporating such a 3D scanner or 360-camera, such as an autonomous vehicle, a robot vacuum cleaner, or an autonomous drone. Accordingly, it should be appreciated that the illustrated embodiment of the end-user device 700 is only one exemplary embodiment is merely representative of any of various manners or configurations of end-user devices.

The processor 710 is configured to execute instructions to operate the end-user device 700 to enable the features, functionality, characteristics and/or the like as described herein. To this end, the processor 110 is operably connected to the memory 720, and the 360-camera sensor 730. The processor 710 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 710 may include a system with a central processing unit, graphics processing units, multiple processing units, dedicated circuitry for achieving functionality, programmable logic, or other processing systems.

The memory 720 is configured to store data and program instructions that, when executed by the processor 710, enable the end-user device 700 to perform various operations described herein. The memory 720 may be of any type of device capable of storing information accessible by the processor 710, such as a memory card, ROM, RAM, hard drives, discs, flash memory, or any of various other computer-readable medium serving as data storage devices, as will be recognized by those of ordinary skill in the art. In at least one embodiment, the memory 720 stores the trained machine perception model 740.

The 360-camera sensor 730 is configured to capture an omnidirectional image of an environment. The 360-camera sensor 730 may capture the omnidirectional image in any suitable format, such as the Equirectangular Projection (ERP) image format, the Cubemap Projection (CMP) image format, and the Equiangular Cubemap Projection (EAC) image format.

The processor 710 is configured to operate the 360-camera sensor 730 to capture an omnidirectional image and execute program instructions of the trained machine perception model 740 to generate perception outputs (e.g., depth estimations, semantic segmentation labels, etc.) based on an omnidirectional image captured using the 360-camera sensor 730. In some embodiments, the process 710 operates one or more actuators (not shown) based on the generated perception outputs.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for training a model to perform a perception task with respect to omnidirectional images, the method comprising:
receiving, with a processor, an omnidirectional image;
generating, with the processor, a plurality of perspective projection images based on the omnidirectional image;
determining, with the processor, a first plurality of perception outputs based on the plurality of perspective projection images using a first model, the first model being configured to perform the perception task with respect to perspective projection images; and
training, with the processor, a second model using the omnidirectional image and depending on the first plurality of perception outputs, the second model being trained to perform the perception task with respect to perspective projection images,
wherein the training the second model further comprises (i) determining, with the processor, a second plurality of perception outputs based on the omnidirectional image using the second model, and (ii) training the second model based on a comparison of the first plurality of perception outputs and the second plurality of perception outputs,
wherein the training the second model further comprises (i) projecting the second plurality of perception outputs into output spaces of the first plurality of perception outputs, (ii) evaluating at least one loss function depending on the first plurality of perception outputs and the projected second plurality of perception outputs, and (iii) fine-tuning parameters of the second model depending on the evaluation of the at least one loss function, wherein the determining the first plurality of perception outputs further comprises (i) determining, for each respective perspective projection image in the plurality of perspective projection images, a respective first plurality of intermediate perception outputs based on the respective perspective projection image using the first model, the respective first plurality of intermediate perception outputs being output by an intermediate component of the first model, and (ii) determining, for each respective perspective projection image in the plurality of perspective projection images, a respective first plurality of final perception outputs, based on the respective first plurality of intermediate perception outputs using the first model, the respective first plurality of final perception outputs being a final output of the first model, wherein the determining the second plurality of perception outputs further comprises (i) determining a second plurality of intermediate perception outputs based on the omnidirectional image using the second model, the second plurality of intermediate perception outputs being output by an intermediate component of the second model, and (ii) determining a second plurality of final perception outputs, based on the second plurality of intermediate perception outputs using the second model, the second plurality of final perception outputs being a final output of the second model, wherein the training the second model further comprises (i) projecting the second plurality of intermediate perception outputs into output spaces of each respective first plurality of intermediate perception outputs, (ii) evaluating a second loss function depending on each respective first plurality of intermediate perception outputs and the projected second plurality of intermediate perception outputs, (iii) projecting the second plurality of final perception outputs into output spaces of each respective first plurality of final perception outputs, (iv) evaluating a first loss function depending on each respective first plurality of final perception outputs and the projected second plurality of final perception outputs, (v) and fine-tuning parameters of the second model depending on the evaluations of the first loss function and of the second loss function.

2. The method according to claim 1, wherein the first loss function is a Kullback-Leibler divergence loss.

3. The method according to claim 1, wherein the second loss function is a hint loss.

4. The method according to claim 1, the training the second model further comprising:
evaluating a third loss function depending on the second plurality of final perception outputs and at least one ground truth label for the omnidirectional image; and
fine-tuning parameters of the second model depending on the evaluation of the third loss function.

5. The method according to claim 1, the training the second model further comprising:
changing a dimensionality of the second plurality of intermediate perception outputs by applying a convolution operation to the second plurality of intermediate perception outputs, prior to projecting the second plurality of intermediate perception outputs.

* * * * *